May 6, 1969 R. H. ZIMMERMAN 3,443,127

BUFFERED EMITTER-COUPLED TRIGGER CIRCUIT

Filed Dec. 6, 1965

INVENTOR:
Rhoderick H. Zimmerman

By John B. Miller, Jr.
Agent

3,443,127
BUFFERED EMITTER-COUPLED TRIGGER CIRCUIT

Rhoderick H. Zimmerman, Canoga Park, Calif., assignor to Litton Systems, Inc., Beverly Hills, Calif.

Filed Dec. 6, 1965, Ser. No. 511,871
Int. Cl. H03k 3/26
U.S. Cl. 307—290 4 Claims

ABSTRACT OF THE DISCLOSURE

An emitter-coupled trigger circuit employing a buffer stage to intercouple first and second trigger stages. The buffer stage serves to reduce the impedance loading of the second trigger stage on the first trigger stage and to assure precise, but not excessive, cutoff of the second stage when the first stage is strongly conductive; thereby reducing hysteresis in the trigger circuit while at the same time reducing the complexity of circuit design.

Figure 1:
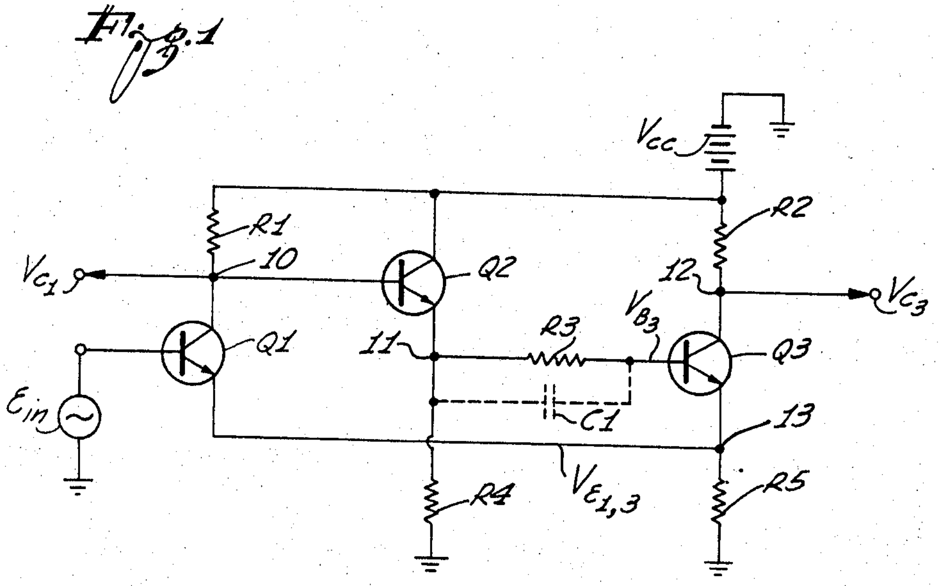

The present invention relates to a trigger circuit, and, more particularly, to a stable, emitter-coupled trigger circuit.

Trigger circuits of the type presently under consideration have two stable (or quasi-stable) states, and may be caused to make an abrupt transition from one state to another. One type of trigger circuit having a number of significant applications in pulse circuitry for the generation of square waves from short pulses and sinusoidally shaped electrical signals, and for the performance of certain digital operations (such as counting), is an emitter-coupled trigger circuit. The circuit includes two active circuit devices, normally transistors, connected together in such a manner that when one active device is conducting current the second active device is rendered nonconductive and vice versa. Such a two-stage trigger circuit also is known to those skilled in the art as a Schmitt trigger circuit, named after its inventor.

As indicated above, one particular use of the emitter-coupled trigger circuit is to impart a square or rectangular shape to applied signals. This means that, regardless of the shape of the input signal's waveform, the output signal's waveform, theoretically, will be a square-wave. The duration of the positive portion of the output square-wave corresponds to the interval between the time when the input signal exceeds an upper threshold voltage $E_1$ and the time when the input signal decreases to a lower threshold voltage $E_2$. The threshold voltages $E_1$ and $E_2$ are primarily determined by the base characteristics of the transistors that are used and typically have a magnitude of one-half volt. However, inherent in such trigger circuits is a hysteresis, or backlash effect, the value of which is equal to the upper voltage $E_1$, at which triggering occurs on the increasing half-cycle of the input signal, minus the lower voltage $E_2$ at which triggering occurs on the decreasing half-cycle of the input signals. Hysteresis causes the transitions of the output signal of the trigger circuit to shift in time from the desired timing of the square waves, and reduces the sensitivity of the circuit.

Others in the past have demonstrated how hysteresis may be made very small or even negative by the proper choice of circuit parameters. However, in such prior art trigger circuits, instability often results unless extreme care is exercised in the selection of components and component values. Moreover, the waveform of an output signal from the first stage of these trigger circuits is often distorted because of the impedance load the second stage presents to the first stage. The out-of-phase output signal, as it is sometimes called, at the first stage usually cannot be used for this reason.

Additionally, the Schmitt trigger circuit is somewhat difficult to design, for the design of a Schmitt trigger circuit involves complex tradeoffs between the values of reference voltages, hysteresis, components, and the ratios between component values. For example, when computing the values of components, reference and supply voltages in order to give acceptable circuit parameters, one encounters considerable difficulty because of the interdependency of the circuit parameters of the first stage with those of the second stage. One must normally maintain a certain ratio between the values of critical components and voltages to hold the second stage nonconductive while the first state is held conductive and vice versa. Only a limited combination of supply and reference voltage values will satisfy both conditions. Accordingly, a variation in the value of a component or the supply voltage when the circuit is operating often causes the circuit to drift or to become oscillatory. The standard procedure, therefore, has been to leave a small amount of backlash or hysteresis in the circuit operation in order to insure that the loop gain will remain less than unity even if the circuit drifts somewhat. However, as mentioned above, the existence of hysteresis produces distortion in the output waveform and decreases the sensitivity of the trigger circuit.

It is, therefore, an object of the present invention to facilitate the design of emitter-coupled trigger circuits.

A further object of the present invention is to obtain useful out-of-phase output signals from an emitter-coupled trigger circuit.

Yet another object of the present invention is to stabilize the operation of an emitter-coupled trigger circuit.

It is yet another object of the present invention to more precisely define a stable triggering point by reducing the hysteresis in trigger circuits.

Another object of the present invention is to allow greater freedom in the selection of component values when designing a trigger circuit for a particular application.

Yet another object of the invention is to create a high input impedance trigger circuit which may be directly connected to a differential amplifier or a similar sensitive circuit.

A further object of the present invention is to provide a trigger circuit having significantly improved sensitivity to A.C. signals.

Still another object of the present invention is to precisely regulate the cutoff voltages of the second trigger stage.

These and other objects are achieved in accordance with features of the invention by an emitter-coupled trigger circuit employing a nonlinear current conducting element to intercouple the first and second trigger stages of the trigger circuit for assuring precise but not excessive cutoff of the second stage when the first stage is strongly conductive, regardless of the choice of reference voltage. As will be apparent from the following description, because the active current conducting elements of the first and second trigger stages are semi-isolated from one another, hysteresis in the trigger circuit is substantially reduced and greater flexibility of operation (with respect to choices of supply and reference voltages) is achieved. Additionally, the nonlinear current conducting element is biased so as to be a negligible impedance load on the first stage, thereby allowing one to obtain a useable out-of-phase output signal from the first stage, and so that its inclusion in the trigger circuit does not introduce delays in the circuit response.

These and other advantages and features which are believed to be characteristic of the present invention, both as to its organization and method of operation, will be understood from the following description considered in connection with the accompanying drawings in which one embodiment of the present invention is illustrated by way of example. It is to be expressly understood, however, that the drawings are for the purpose of illustration and description only and are not intended as a definition of the limits of the invention.

Figure 2:
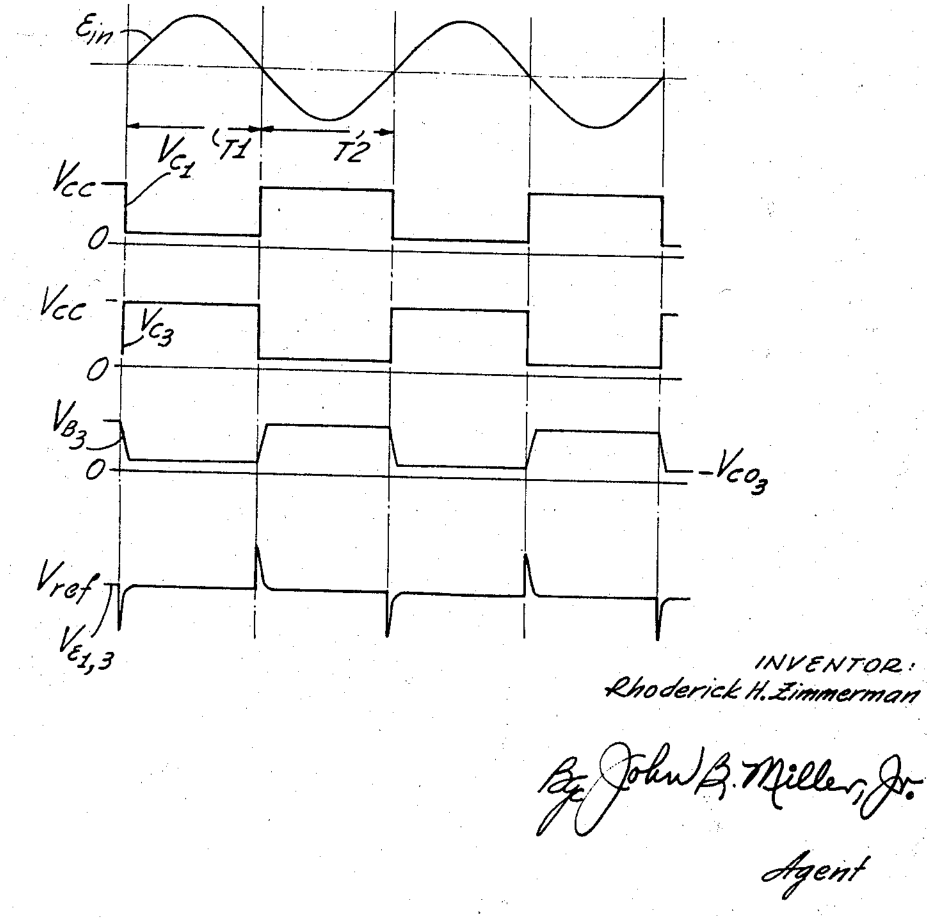

In the drawings:

FIGURE 1 is a schematic diagram of an improved emitter-coupled trigger circuit constructed according to teachings of the present invention; and FIGURE 2 graphically illustrates a number of waveforms of signals having a common time base that may appear at various junctions in the circuit illustrated in FIGURE 1.

Attention is now directed to the drawings where, in FIGURE 1, there is shown one embodiment of a buffered emitter-coupled trigger circuit employing three transistors $Q_1$, $Q_2$ and $Q_3$. These transistors may be one of a number of suitable types, such as a 2N706 or a 2N709, which exhibit a collector to emitter saturation voltage of less than five hundred millivolts for silicon devices, or less than one hundred millivolts for germanium devices. Obviously, the transistors $Q_1$, $Q_2$, and $Q_3$ possess other characteristics for the intended application of the trigger circuit, (such as a current gain B of twenty to thirty at the desired collector current) which are easily determinable by those skilled in the art. As may be seen in FIGURE 1, a collector electrode of the transistor $Q_1$ is connected to the base electrode of the transistor $Q_2$, and is connected through a resistor $R_1$ to the collector bias voltage supply $V_{cc}$. The emitter electrode of the transistor $Q_1$ is coupled, together with the emitter electrode of the transistor $Q_3$, through a resistor $R_5$ to ground. The emitter electrode of the transistor $Q_2$ is coupled through a resistor $R_3$ to the base electrode of the transistor $Q_3$, and through a resistor $R_4$ to ground. The collector electrode of the transistor $Q_2$ is coupled to the collector bias supply $V_{cc}$, while the collector electrode of the transistor $Q_3$ is coupled through a resistor $R_2$ to the bias supply $V_{cc}$.

Assuming the quiescent condition (an input below the lower threshold voltage $E_2$) with transistor $Q_1$ at cutoff, the collector voltage at $Q_1$ is approximately equal to the supply voltage $V_{cc}$. This positive voltage is coupled to the base electrode of the transistor $Q_2$. Transistor $Q_2$, being connected in the circuit as a common-collector amplifier with an amplified current output provided at the emitter, responds to the positive input voltage at its base electrode by an increase in current up through the load resistor $R_4$. This increase in current through the resistor $R_4$ causes a terminal 11 between the emitter electrode of transistor $Q_2$ and the resistor $R_4$ to become more positive with respect to the grounded side of the resistor $R_4$. The value of the resistor $R_4$ is chosen so as to continually bias the transistor $Q_2$ into conduction, regardless of the conducting states of the transistors $Q_1$ and $Q_3$. The positive voltage at the terminal 11 is coupled through the resistor $R_3$ to the base electrode of the transistor $Q_3$. Thus, a base voltage $V_{B_3}$ of the transistor $Q_3$ is equal to the voltage drop from the base to the emitter electrodes in transistor $Q_3$ plus a voltage drop $V_{ref}$ across the resistor $R_5$ (also called the reference or "baseline" voltage of the common emitter voltage $V_{E1,3}$).

Current flow from the emitter electrodes of the transistor $Q_3$ through common emitter resistor $R_5$ to ground maintains the desired reference voltage $V_{ref}$ at the emitter electrodes of the transistors $Q_1$ and $Q_3$. The reverse bias now developed between the emitter electrode and the base electrode of the transistor $Q_1$ maintains the cutoff condition of that transistor. The high positive voltage at the emitter electrode of the transistor $Q_2$ produces forward bias for the base-emitter junction of the transistor $Q_3$ and causes it to operate in the saturation region.

If a positive signal $E_{in}$ (input signal above the threshold voltage $E_1$), as shown in FIGURE 2 during the time period $T_1$, is applied to the base electrode of the transistor $Q_1$, the signal $E_{in}$ will overcome the reverse bias on transistor $Q_1$ and cause the transistor $Q_1$ to conduct. The potential at the collector electrode of the transistor $Q_1$ decreases; this change in potential is coupled to the base electrode of the transistor $Q_2$. While still conductive, the potential at the emitter electrode of the transistor $Q_2$, equal to the supply voltage $V_{cc}$ minus the voltage drop across the resistor $R_1$ minus the base-emitter voltage drop in the transistor $Q_2$, begins to decrease until it reaches a critical value where current provided to the transistor $Q_3$ is not sufficient to keep the transistor $Q_3$ operating at saturation. The change in potential at the emitter of transistor $Q_2$ is coupled through the resistor $R_3$ to the base electrode of the transistor $Q_3$. The emitter current of transistor $Q_3$ decreases, lowering the potential across the resistor $R_5$. Consequently, the emitter potential of transistor $Q_1$ becomes less negative, increasing the forward bias and increasing collector current. This regenerative action continues until the transistor $Q_1$ is operating in the saturation region and transistor $Q_3$ is just cut off, but not overly so, at which time the voltage $V_{B3}$ at the base electrode of the transistor $Q_3$ has stabilized at its low level $V_{co3}$. The output voltage $V_{c1}$, as shown in FIGURE 2, measurable at terminal 10 connected to the collector electrode of the transistor $Q_1$, is at a low level state when the input signal $E_{in}$ exceeds the upper threshold voltage $E_1$; and switches to a high level state when the input signal $E_{in}$ decreases below the lower threshold voltage $E_2$. The difference in the value of the upper and lower threshold voltages $E_1$ and $E_2$, respectively, is equal to the hysteresis of the trigger circuit, and in circuits in accordance with the principles of the subject invention this hysteresis value is extremely small. Hence in the graph of FIGURE 2, the levels of $E_1$ and $E_2$ are not indicated, however it may be assumed in the graph depicting the input signal $E_{in}$, that the threshold level $E_1$ is slightly above the abscissa coordinate and the reference level $E_2$ is slightly below this abscissa coordinate.

The back-bias across the base emitter junction of the transistor $Q_3$ during the nonconductive period ($T_1$) of the transistor $Q_3$, is limited in the circuit of the present invention to a value equal to the saturated collector-emitter voltage drop across the transistor $Q_1$ minus the base-emitter voltage drop across the transistor $Q_2$. This limitation of the back-bias potential makes the change in magnitude of hysteresis in the circuit negligible as a function of any other circuit parameters. For most transistor types, this hysteresis value is between 100 and 300 millivolts. The controlled back-bias also allows higher magnitudes of reference voltages (the voltage across resistor $R_5$) to be used when the trigger circuit is to respond to DC input signals.

The new stable condition continues until the input signal $E_{in}$ begins to decrease in value. This negative input signal $E_{in}$, as for example during the second time interval $T_2$, decreases the base potential of transistor $Q_1$ and increases the reverse bias. This causes the collector voltage at terminal 10 to increase, emitter voltage at terminal 13 to decrease, and the potential across the resistor $R_5$ to decrease. Simultaneously, the increasing voltage at the collector electrode of the transistor $Q_1$ is coupled to the base electrode of transistor $Q_2$ driving it more positive and causing a corresponding increase in the emitter voltage at the terminal 11 to be transferred across the resistor $R_3$ to the base electrode of the transistor $Q_3$. The decreasing voltage across the resistor $R_5$ causes the emitter of transistor $Q_3$ to go more negative. Both actions reduce the reverse bias of the emitter-base junction of the transistor $Q_3$, and the transistor $Q_3$ again operates at saturation, cutting off the transistor $Q_1$ and returning the circuit to its original operating conditions. The output signal $V_{c3}$, measurable at the terminal 12 connected to the collector electrode of the transistor $Q_3$, as shown in FIGURE 2, is at a high level state during the time period when the input signal $E_{in}$ exceeds the upper threshold voltage $E_1$. The rise and fall time of the output signal $V_{c3}$ of this circuit may be shortened by inserting a capacitor $C_1$ in parallel with the resistor $R_3$ between the terminal 11 and the emitter electrode of transistor $Q_3$, shown in FIGURE 1 in dotted line form.

Having described the interconnection and operation of the components for the circuit illustrated in FIGURE 1, the criteria for choosing component values may be expressed by the following equations, which assume that fixed DC potentials have been appropriately chosen for the emitter reference and collector supply voltages. Having chosen a desired magnitude of collector current, the values of the resistors $R_1$, $R_2$, and $R_5$ may be determined by simultaneously solving the equations:

$$R_1=R_2 \qquad \text{(I)}$$

$$i_c=\frac{V_{cc}-V_{ce_2(\text{sat.})}}{R_2+R_5} \qquad \text{(II)}$$

and $$V_{ref}=\frac{(B+1)i_cR_5}{B} \qquad \text{(III)}$$

where $V_{c3(\text{sat.})}$ is the collector to emitter saturation voltage for the transistor $Q_3$; B is the current gain factor for the transistor $Q_3$; and $i_c$ is the selected collector current flowing through the transistor $Q_3$.

The values of the resistors $R_3$ and $R_4$ may be computed using the following equations:

$$R_3\leq\frac{V_{cc}-(V_{ref}+2V_{be})B}{I_c} \qquad \text{(IV)}$$

and $$R_4\leq\frac{V_{ref}+V_{ce(\text{sat.})}-V_{be}}{i_{c\ (\text{minimum})}} \qquad \text{(V)}$$

where $V_{ref}$ is the DC component of the emitter voltage at the junction of the emitter electrodes of the transistors $Q_1$ and $Q_3$; and all other voltage and current factors are with reference to the transistor $Q_3$. The value of the resistor $R_3$ is selected to provide sufficient base current to saturate the transistor $Q_3$ when the transistor $Q_1$ is nonconductive; while the value of the resistor $R_4$ is chosen to hold the transistor $Q_2$ in a conductive state when the transistor $Q_1$ is saturated and the transistor $Q_3$ is nonconductive.

In one specific illustrative embodiment of the invention, the foregoing circuit elements employed in the buffered emitter-coupled trigger circuit of the invention may take the following illustrative values;

*Table I*

| | | |
|---|---|---|
| Transistors $Q_1$, $Q_2$, and $Q_3$ | | 2N706 |
| Resistors $R_1$, $R_2$ | ohm | 2,200 |
| Resistors $R_3$ and $R_4$ | do | 50,000 |
| Resistor $R_5$ | do | 5,600 |

It is to be understood that the above-described arrangements are illustrative of the application of the principles of the invention. A number of other circuit arrangements may be devised by those skilled in the art for coupling the first stage to the second stage of a trigger circuit and for providing a buffer therebetween without departing from the spirit and scope of the invention. Thus, by way of example and not of limitation, one may readily substitute a more complex amplifier circuit in place of the single transistor $Q_2$, or one could insert other current amplifying elements in place thereof. Moreover, various circuits (such as a differential amplifier) may be used to provide the trigger circuit of the invention with complementary signals for selectively causing the trigger circuit elements to make the transition between conduction and nonconduction. Since the trigger circuit of the invention is more simply constructed than those of the prior art, for a given application it is possible to construct the circuit in monolithic integrated form or thin film hybrid form rather than using discrete components.

Accordingly, from the foregoing, it is evident that various changes may be made without departing from the spirit of the invention as defined in the appended claims.

What is claimed is:

1. A trigger circuit comprising:

first and second current conducting devices, each of said current conducting devices having an input element, an output element, and a control element;

bias means coupled to the input elements of said first and second current conducting devices for maintaining a reference voltage at the input elements;

means coupled to the output elements of said first and second current conducting devices for determining the amount of current conducted by each of said first and second current conducting devices;

a third current conducting device having an input element, an output element, and a control element, the control element of said third current conducting device being coupled to the output element of said first current conducting device, and the output element of said third current conducting device being coupled to said current determining means;

circuit means for coupling the input element of said third current conducting device to the control element of said second current conducting device and to a reference potential plane; said circuit means including a first resistive device intercoupling the input element of said third conducting device and the control element of said second current conducting device, and a second resistive device one side of which is coupled to said reference potential plane and the other side of which is directly coupled to the input element of said third current conducting device; and means coupled to the control element of said first current conducting device for applying an input signal thereto to cause said first current conducting device to change the state of conduction thereof.

2. The combination as defined in claim 1 wherein said first, second and third current conducting devices comprise transistors, and wherein said input, output and control elements are the emitter, collector, and base electrodes, respectively, of said transistors.

3. The combination as defined in claim 1 wherein said bias means includes a resistor coupled between said reference potential plane and the input elements of said first and second current conducting devices; whereby said second current conducting device conducts a predetermined amount of current when said first current conducting device is nonconducting, and said second current conducting device is rendered nonconducting by a predetermined back-bias potential when said first current conducting device is conducting.

4. The combination as defined in claim 1 wherein said current determining means includes a voltage source, a first resistor intercoupling said voltage source and the output element of said first current conducting device, and a second resistor intercoupling said voltage source and the output element of said second current conducting device.

References Cited

UNITED STATES PATENTS

| | | | |
|---|---|---|---|
| 3,300,654 | 1/1967 | Delanoy et al. | 307—290 |
| 3,324,309 | 6/1967 | Zeller | 307—290 |

OTHER REFERENCES

Electronic Industries, May 1961, pages 102 and 103.

ARTHUR GAUSS, *Primary Examiner.*

H. A. DIXON, *Assistant Examiner.*